May 22, 1951          E. CAPETTA          2,553,630
PAWL TYPE ONE-WAY BRAKE
Original Filed Nov. 6, 1930          2 Sheets-Sheet 1
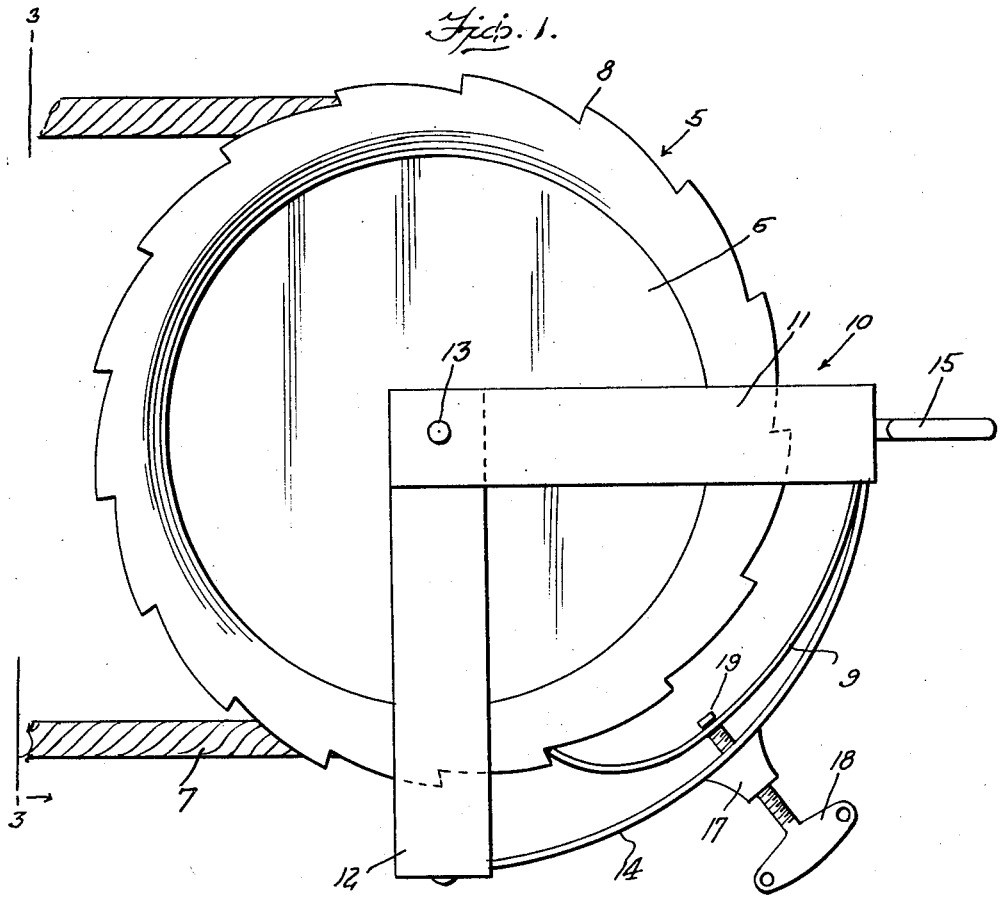
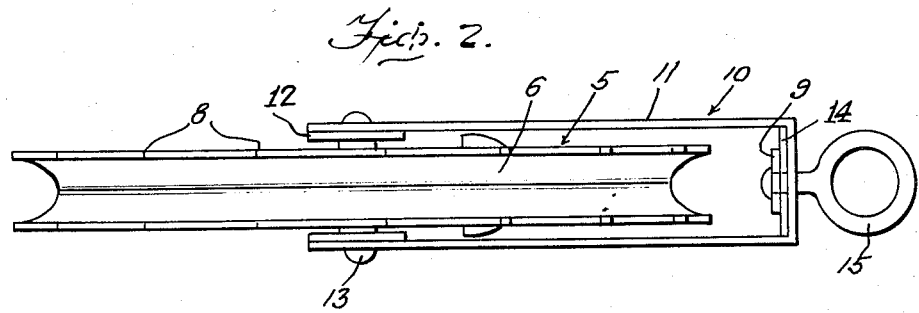
Inventor
E. Capetta
By *Clarence A. O'Brien*, Attorney

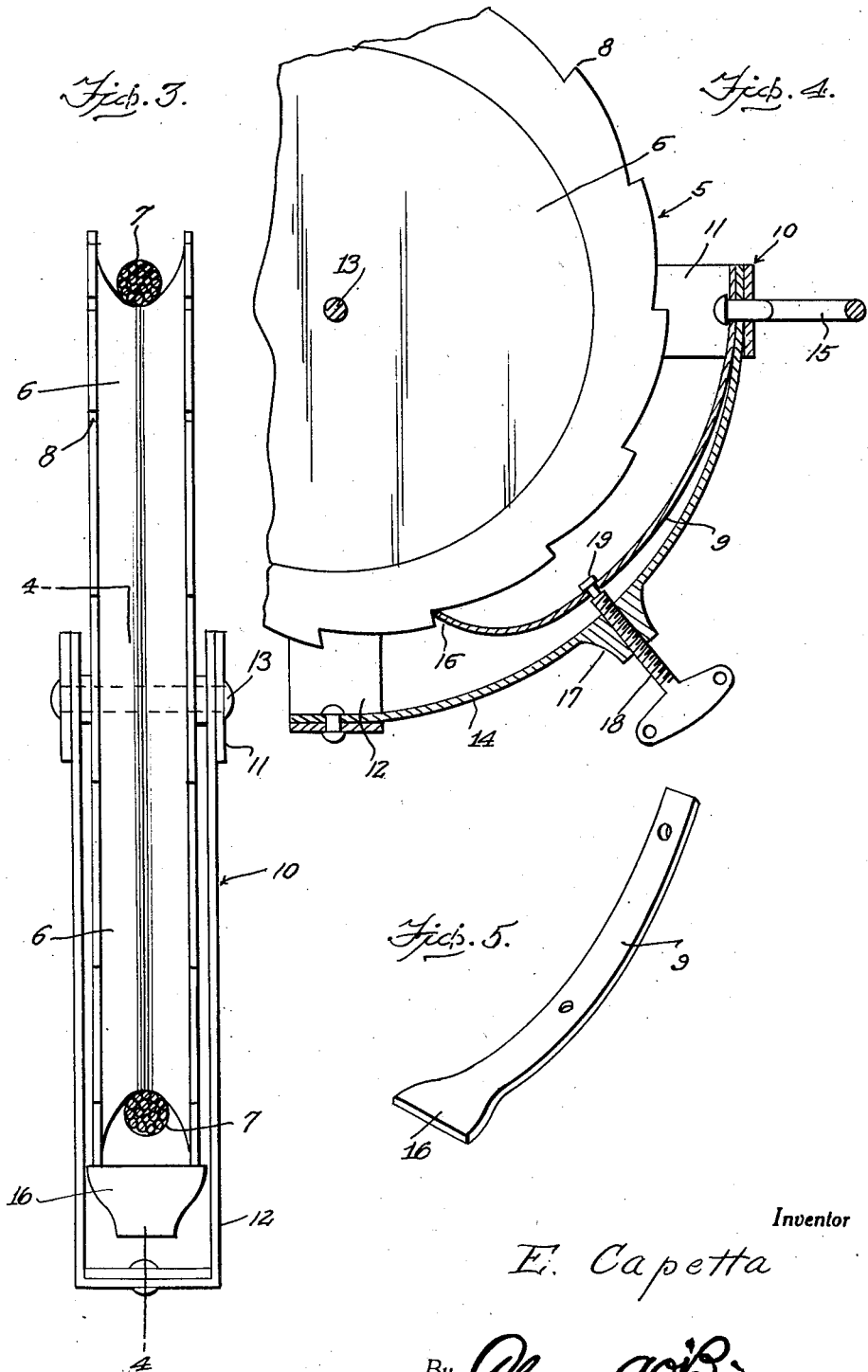

Patented May 22, 1951

2,553,630

UNITED STATES PATENT OFFICE 2,553,630

PAWL TYPE ONE-WAY BRAKE

Ernest Capetta, Lodi, N. J.

Substituted for abandoned application Serial No. 493,893, November 6, 1930. This application September 8, 1948, Serial No. 48,307

1 Claim. (Cl. 188—82.7)

This is a substitute application for my allowed and abandoned case, Serial No. 493,893, filed November 6, 1930.

The invention relates to new and useful improvements in clothesline pulleys, and more particularly to a pulley which eliminates the danger of injuring persons handling clotheslines which is generally occasioned by the fingers of the person being caught between the line and the pulley.

The principal object of the invention is to provide a pulley which will eliminate the above trouble without increasing the cost over similar types of pulleys now on the market, and at the same time offering considerably more advantages and safeguards.

In the drawings.

Figure 1 represents a side elevational view of a novel pulley;

Figure 2 is a sectional view taken in the plane of the pulley;

Figure 3 is a sectional view taken substantially on the line 3—3 of Figure 1;

Figure 4 is a sectional view taken on the line 4—4 of Figure 3;

Figure 5 is a perspective view of the spring pawl.

In the drawings, it is seen that the numeral 5 generally refers to the pulley wheel which is made up of the two plates 6 suitably fastened together and having their peripheries curving outwardly to form the groove for the clothesline 7. The flanges of this pulley are provided with ratchet teeth 8 for receiving the free end of the spring pawl 9 to prevent rotation of the wheel in one direction.

The numeral 10 designates a frame made up of a pair of U-shaped members 11 and 12, apertured at their face ends and disposed in registration to receive the pin 13 which extends axially through the center of the pulley wheel 5. A strap 14 connects the U-shaped members 11 and 12 at their bight portions. The U-shaped member 11 has an eye 15 at its bight portion whereby the pulley and its frame can be supported by a hook or similar element on a spoke or wall.

Also secured to the bent portion of the U-shaped member 11 by the eye member 15 is the aforementioned spring pawl 9 which is provided with a flared head 16 engageable with the teeth of the flanges on the pulley 5. A boss 17 on the strap 14 has a bore therethrough for receiving the winged screw 18 which is swivelly connected to the spring pawl 9 as at 19.

Obviously the wheel can only rotate in one direction and the tension of the spring pawl 9 against the flanges of the wheel will act as a brake to retard the rotation thereof.

It is apparent that variations may be made without departing from the spirit of the invention.

Having described the invention, what is claimed as new is:

A clothes line pulley comprising a frame composed of two U-shaped members arranged at right angles to each other, with the extremities of the limbs of one member overlapping the extremities of the limbs of the other member, a pin passing through said overlapping extremities, a pulley journalled in the frame by said pin, an arcuate strap having its ends connected with the bights of said U-shaped members, a spring pawl having one end connected with one end of the arcuate strap and said pawl being located between a portion of the pulley and the strap with its free end engaging the periphery of the pulley, said periphery of the pulley having ratchet teeth formed thereon for engagement by the free end of the pawl, said strap having a threaded boss formed on an intermediate portion and a screw passed through the boss and having its inner end swiveled to the pawl for adjusting the tension of said pawl.

ERNEST CAPETTA.

REFERENCES CITED

The following references are of record in the file of this patent:

UNITED STATES PATENTS

| Number | Name | Date |
|---|---|---|
| 187,867 | Knapp | Feb. 27, 1877 |
| 222,689 | Garver | Dec. 16, 1879 |
| 390,845 | Lamarre | Oct. 9, 1888 |
| 811,440 | Roberts | Jan. 20, 1906 |
| 907,082 | Morrison | Dec. 15, 1908 |
| 1,106,696 | Brown | Aug. 11, 1914 |
| 1,442,396 | Goets | Jan. 16, 1923 |
| 1,773,745 | Nacker | Aug. 26, 1930 |
| 1,820,322 | Polkosnik | Aug. 25, 1931 |
| 1,856,993 | Irwin | May 5, 1932 |